(12) United States Patent
Cao et al.

(10) Patent No.: US 10,817,699 B2
(45) Date of Patent: Oct. 27, 2020

(54) FINGERPRINT RECOGNITION DEVICE, DISPLAY SUBSTRATE AND DISPLAY APPARATUS

(71) Applicant: BOE TECHNOLOGY GROUP CO., LTD., Beijing (CN)

(72) Inventors: Xueyou Cao, Beijing (CN); Xue Dong, Beijing (CN); Jing Lv, Beijing (CN); Haisheng Wang, Beijing (CN); Xiaoliang Ding, Beijing (CN); Yingming Liu, Beijing (CN); Yanling Han, Beijing (CN); Wei Liu, Beijing (CN); Chunwei Wu, Beijing (CN); Pengpeng Wang, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/316,457

(22) PCT Filed: Mar. 8, 2018

(86) PCT No.: PCT/CN2018/078388
§ 371 (c)(1),
(2) Date: Jan. 9, 2019

(87) PCT Pub. No.: WO2018/177104
PCT Pub. Date: Oct. 4, 2018

(65) Prior Publication Data
US 2019/0294850 A1 Sep. 26, 2019

(30) Foreign Application Priority Data
Apr. 1, 2017 (CN) .......................... 2017 1 0214484

(51) Int. Cl.
*G06K 9/00* (2006.01)

(52) U.S. Cl.
CPC ....... *G06K 9/0004* (2013.01); *G06K 9/00013* (2013.01)

(58) Field of Classification Search
CPC .. G06K 9/0004; G06K 9/00013; G06F 21/32; G06F 2203/0338
See application file for complete search history.

(56) References Cited

U.S. PATENT DOCUMENTS 5,991,467 A * 11/1999 Kamiko ............... G06K 9/0004
382/312
2005/0286186 A1* 12/2005 Chang ................. H01L 27/0251
361/56
(Continued)

FOREIGN PATENT DOCUMENTS

CN 105095874 A 11/2015
CN 105224930 A 1/2016
(Continued)

OTHER PUBLICATIONS

The First Office Action dated Mar. 12, 2019 corresponding to Chinese application No. 201710214484.3.
(Continued)

*Primary Examiner* — Stephen G Sherman
(74) *Attorney, Agent, or Firm* — Nath, Goldberg & Meyer; Joshua B. Goldberg

(57) ABSTRACT

The present disclosure discloses a fingerprint recognition device, a display substrate and a display apparatus. The fingerprint recognition device includes: at least one fingerprint detection component; at least one fingerprint recognition signal line, the fingerprint detection component outputs a detection current to the fingerprint recognition signal line; at least one noise reduction circuit serially coupled in the fingerprint recognition signal line, the noise reduction circuit being a resistive component; and a fingerprint determination circuit coupled to the fingerprint recognition signal line,
(Continued)

configured to determine a morphology of a fingerprint according to a current signal, subjected to a noise reduction by the noise reduction circuit and transmitted by the fingerprint recognition signal line. The fingerprint recognition device can filter out the current generated by coupling the fingerprint recognition signal line with other data lines, the interference with the detection current is reduced, the accuracy of the fingerprint recognition is improved.

13 Claims, 2 Drawing Sheets

(56) References Cited

U.S. PATENT DOCUMENTS

2016/0285433 A1 9/2016 Johal et al.
2017/0123555 A1* 5/2017 Kim .................. G06F 3/0412
2018/0365473 A1* 12/2018 Wang ................. G06K 9/0004

FOREIGN PATENT DOCUMENTS

| CN | 105893992 A | 8/2016 |
| CN | 106157891 A | 11/2016 |
| CN | 106250889 A | 12/2016 |
| CN | 106295465 A | 1/2017 |
| CN | 106372605 A | 2/2017 |
| CN | 106980842 A | 7/2017 |

OTHER PUBLICATIONS

International Search Report dated Jun. 6, 2018 corresponding to application No. PCT/CN2018/078388.

* cited by examiner

FINGERPRINT RECOGNITION DEVICE, DISPLAY SUBSTRATE AND DISPLAY APPARATUS

CROSS-REFERENCE TO RELATED APPLICATION

This is a National Phase Application filed under 35 U.S.C. 371 as a national stage of PCT/CN2018/078388, filed on Mar. 8, 2018, claiming priority to Chinese Patent Application No. 201710214484.3, filed on Apr. 1, 2017, the disclosure of each of which is incorporated herein by reference.

TECHNICAL FIELD

The present disclosure relates to the field of display technology, and in particular, to a fingerprint recognition device, a display substrate including the fingerprint recognition device, and a display apparatus including the display substrate.

BACKGROUND

For a conventional liquid crystal display panel, when the display panel normally displays, it is difficult to perform a fingerprint recognition, and a difficulty includes that a display circuit and a fingerprint recognition circuit are not easily integrated, optical paths in a display area are complicated, and there is a large interference noise which has remarkable influence on a fingerprint signal to be collected by an optical sensor.

SUMMARY

An embodiment of the present disclosure provides a fingerprint recognition device including: at least one fingerprint detection component; at least one fingerprint recognition signal line, the fingerprint detection component outputs a detection current to the fingerprint recognition signal line; at least one noise reduction circuit serially coupled in the fingerprint recognition signal line, the at least one noise reduction circuit including a resistive component; and a fingerprint determination circuit coupled to the fingerprint recognition signal line, configured to determine a morphology of a fingerprint according to a current signal, subjected to noise reduction by the at least one noise reduction circuit and transmitted by the fingerprint recognition signal line.

In an implementation, the fingerprint determination circuit includes an amplifier, a demodulator, a filter, and an analog-to-digital converter, an input terminal of the amplifier is coupled to the fingerprint recognition signal line, and the amplifier is configured to amplify the current signal transmitted by the fingerprint recognition signal line; the demodulator is configured to demodulate the current signal output from the amplifier; the filter is configured to filter the current signal output from the demodulator; the analog-to-digital converter is configured to perform an analog-to-digital conversion on the current signal output from the filter to determine the morphology of the fingerprint.

In an implementation, the fingerprint recognition device includes a plurality of fingerprint detection components and a plurality of fingerprint recognition signal lines, each of the fingerprint detection components including a photodiode and a control transistor, the plurality of fingerprint detection components being arranged in a plurality of rows and a plurality of columns; an anode of the photodiode is coupled to a low level input terminal, and a cathode of the photodiode is coupled to a first electrode of the control transistor in the fingerprint detection component in which the photodiode is included; gates of control transistors of the fingerprint detection components in a same row are coupled to a same control line, and second electrodes of the control transistors of the fingerprint detection components in a same column are coupled to one of the fingerprint recognition signal lines.

In an implementation, the fingerprint recognition device includes a plurality of noise reduction circuits, at least one of the noise reduction circuits being coupled in series in each of the fingerprint recognition signal lines.

In an implementation, the second electrode of each of the control transistors is coupled in series to one of the at least one noise reduction circuit.

In an implementation, the noise reduction circuit includes a resistance element; and/or the noise reduction circuit includes a thin film transistor and a control sub-circuit configured to control the thin film transistor such that the thin film transistor operates in an adjustable resistance region.

In an implementation, the noise reduction circuit has a resistance greater than a preset resistance.

In an implementation, the preset resistance is not less than 1 G ohm.

Another embodiment of the present disclosure provides a display substrate, including the fingerprint recognition device described above.

In an implementation, the display substrate includes a display data line, the fingerprint recognition signal line is provided in parallel with the display data line, and the fingerprint detection component is provided in a pixel element of the display substrate.

Still another embodiment of the present disclosure provides a display apparatus including the display substrate described above.

BRIEF DESCRIPTION OF THE DRAWINGS

The drawings are intended to provide a further understanding of the disclosure, constitute a part of the specification, and are used to explain the present disclosure in conjunction with the following embodiments, but not to limit the present disclosure. In the drawings.

REFERENCE SIGNS

100: fingerprint recognition device;
110: fingerprint detection component;
120: fingerprint recognition signal line;
130: noise reduction circuit;
140: amplifier;
150: demodulator;
160: filter;
170: analog-to-digital converter;
200: display substrate;
210: display data line;
220: sub-pixel element;

VD: low level input terminal; T1: control transistor; T2: driving transistor; G1: control line; G2: gate line; GOA: gate driving circuit.

DETAILED DESCRIPTION

Specific embodiments of the present disclosure will be described in detail below with reference to the accompanying drawings. It should be understood that the specific embodiments described herein are only used to explain and illustrate the present disclosure, but not to limit the present disclosure.

In a conventional display panel with fingerprint recognition function, since a fingerprint recognition signal line is close to a display data line or other display elements, the fingerprint recognition signal line is easily coupled to the data line or the display elements closed thereto, therefore, fingerprint recognition is easily to be interfered, and an accuracy of fingerprint recognition is low.

In view of above, how to effectively improve the accuracy of fingerprint recognition has become a technical problem to be solved urgently in the art.

Figure 1:
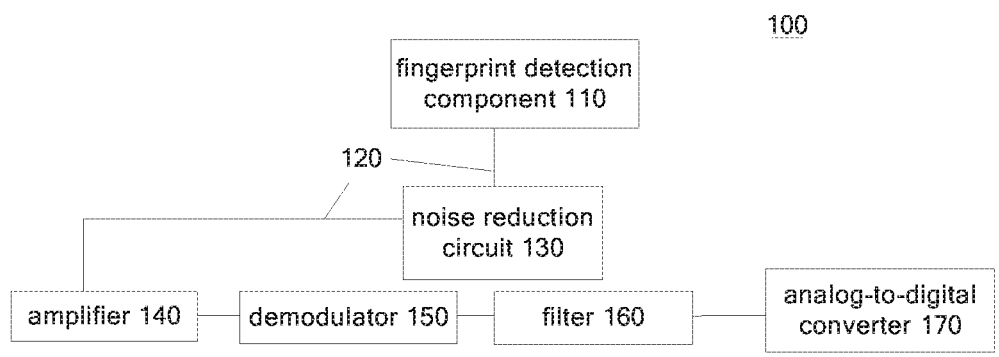
FIG. 1 is a schematic structural diagram of a fingerprint recognition device according to an embodiment of the present disclosure.

Referring to FIG. 1, in an aspect, the present disclosure provides a fingerprint recognition device 100. The fingerprint recognition device 100 includes a fingerprint detection component 110 and a fingerprint recognition signal line 120, the fingerprint detection component 110 outputs a detection current to the fingerprint recognition signal line 120. The fingerprint recognition device 100 further includes a noise reduction circuit 130. The noise reduction circuit 130 is coupled in series in the fingerprint recognition signal line 120, and the noise reduction circuit 130 has a resistance and a value of the resistance is greater than a preset resistance value.

It should be noted that the specific structure of the noise reduction circuit 130 is not limited. For example, the noise reduction circuit 130 may be merely a resistive device, which may be a device having a fixed resistance or a device with an adjustable resistance. Certainly, the noise reduction circuit 130 may also be another structural device having a certain resistance.

It should be further noted that the specific structure of the fingerprint detection component 110 is not limited. However, the fingerprint detection component 110 should be capable of converting a received fingerprint signal into a current signal, that is, the detection current described above. For example, the fingerprint detection component 110 may be a photosensor. Certainly, the fingerprint detection component 110 may also be another device having a function similar to that of the photosensor.

For products in which the fingerprint recognition device 100 is applied to implement fingerprint recognition, for example, for a display panel, the fingerprint recognition device 100 is generally integrated in a pixel element of the display panel.

Since wiring arrangement of pixel circuit of the display panel is complicated, for example, a plurality of gate lines and a plurality of data lines are arranged, the fingerprint recognition signal line 120 of the fingerprint recognition device 100 is close to the gate line or the data line. When the fingerprint detection component 110 outputs the detection current to the fingerprint recognition signal line 120, the fingerprint recognition signal line 120 is easily coupled with the gate line or the data line or the like, causing interference with the detection current, thereby affecting the accuracy of fingerprint recognition. However, the fingerprint recognition device 100 of the present embodiment further has a noise reduction circuit 130 provided in series in the fingerprint recognition signal line 120. The noise reduction circuit 130 has a large resistance, which can effectively reduce the magnitude of the detection current received by the fingerprint recognition signal line, so that the current generated by the coupling can be filtered out and the accuracy of fingerprint recognition is improved.

In the present disclosure, the specific structure of the noise reduction circuit is not particularly limited, as long as the resistance of the noise reduction circuit is greater than the preset resistance. For example, the noise reduction circuit 130 described above may include a resistive component and/or a thin film transistor.

Specifically, the resistive component may be a device with a fixed resistance greater than a preset resistance, or a device with an adjustable resistance, for example, may be a sliding rheostat or the like.

Figure 4:
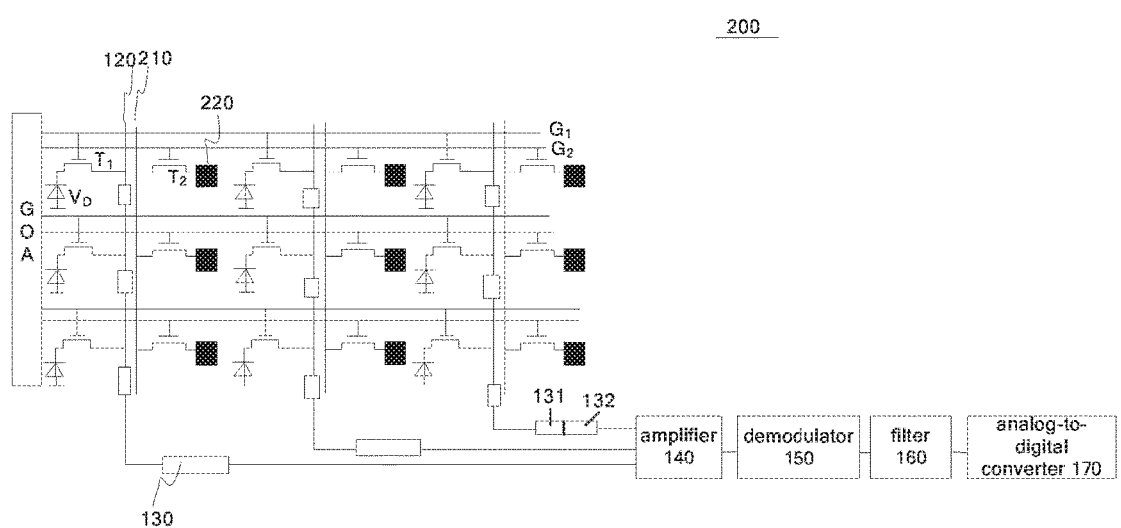
FIG. 4 is a schematic structural diagram of a display substrate in an embodiment of the present disclosure.

The resistive component may also be a thin film transistor. Three characteristic regions of the transistor, for example, a saturation region, a cutoff region, and an adjustable resistance region, and how to control the transistor so that the transistor operates in different regions belong to common knowledge in the art, thus will not be repeated herein. Therefore, in a case where the noise reduction circuit 130 includes a thin film transistor 131, the noise reduction circuit 130 further includes a control sub-circuit 132, as shown in FIG. 4, the control sub-circuit 132 is configured to control the thin film transistor 131 and apply different voltages thereto, so that the thin film transistor 131 operates in the cut-off region or the adjustable resistance region, therefore, the thin film transistor can have a resistance with a preset resistance value.

It should be understood that when the thin film transistor is controlled by the control sub-circuit so that the thin film transistor operates in the adjustable resistance region, the resistance value of the thin film transistor can be adjusted according to different voltages applied to the thin film transistor by the control sub-circuit so as to obtain different resistance values.

In the fingerprint recognition device 100 in the present embodiment, a simple resistive component or a thin film transistor having a function the same as that of the resistive component is used as the specific structure of the noise reduction circuit 130, thus, in addition to that the interference with the fingerprint recognition signal can be reduced, the structure of the fingerprint recognition device 100 is simple, the manufacturing cost of the fingerprint recognition device 100 may be effectively saved and so on.

In some implementations, the preset resistance value is not less than 1 G ohm, in this case, the noise reduction circuit 130 can effectively reduce the interference with the fingerprint recognition, thereby further improving the accuracy of fingerprint recognition. Limiting the preset resistance value to 1 G ohm or more in this embodiment does not mean that the preset resistance value less than 1 G ohm adopted by the noise reduction circuit 130 is excluded, and the preset resistance value less than 1 G ohm still falls within the protection scope of the present disclosure.

In some implementations, the fingerprint recognition device 100 further includes a fingerprint determination circuit, and the fingerprint determination circuit is coupled to the fingerprint recognition signal line, and is configured to determine a morphology of the fingerprint according to the current signal transmitted by the fingerprint recognition signal line.

In the present disclosure, the structure of the fingerprint determination circuit is not particularly limited. In an implementation, the fingerprint determination circuit includes an amplifier 140, a demodulator 150, a filter 160 and an analog-to-digital converter 170. The fingerprint recognition signal line 120 is coupled to an input terminal of the amplifier 140.

It should be understood that an input terminal of the amplifier 140 is coupled to the fingerprint recognition signal line 120, and the fingerprint recognition signal received by the input terminal, that is, the detection current, should be the detection current subjected to noise reduction by the noise reduction circuit 130. That is to say, the detection current sequentially passes through the noise reduction circuit 130 and the amplifier 140.

In the fingerprint recognition device 100 of the present embodiment, the fingerprint detection component 110 converts an acquired ridge-and-valley information of the fingerprint into the detection current. Since the resistive component having the resistance value greater than 1 G ohm exists in the current path of the detection current, the magnitude of the detection current is reduced, so that the detection current becomes a weakened current signal. If a data process is directly performed on the weakened current signal to achieve the fingerprint recognition, the fingerprint ridge-and-valley information recognized may be inaccurate and the accuracy of fingerprint recognition may be lowered. Therefore, it is necessary to introduce the detection current processed by the noise reduction circuit 130 into the amplifier 140 to amplify the weakened current signal, so that the accuracy of fingerprint recognition can be effectively improved, thereby the fingerprint can be effectively recognized.

The demodulator 150 described above is configured to demodulate the signal output from the amplifier 140.

The filter 160 described above is configured to filter the signal output from the demodulator 150.

The analog-to-digital converter 170 described above is configured to perform an analog-to-digital conversion on the signal output from the filter 160.

It should be understood that connection relationship of the fingerprint recognition signal line 120, the amplifier 140, the demodulator 150, the filter 160 and the analog-to-digital converter 170 is shown in FIG. 1, which indicates flow of the signal between any component and the other components. For convenience of explanation, the demodulator 150 is taken as an example, the signal input to the demodulator 150 is the signal output from the amplifier 140, the signal output from the demodulator 150 is transmitted to the filter 160, and others are similar.

In the fingerprint recognition device 100 of the present embodiment, the demodulator 150, the filter 160, and the analog-to-digital converter 170 are provided, the detection current output from the fingerprint detection component 110 can finally be converted into a digital signal through the analog-to-digital converter 170. According to the converted digital signal, the fingerprint recognition can be implemented accurately.

In some implementations, the fingerprint detection component 110 includes a photodiode, a control transistor $T_1$, a low level input terminal $V_D$, and a plurality of control lines $G_1$. In the specific implementation shown in the figure, the fingerprint detection components are arranged in a plurality of rows and a plurality of columns, and each row of fingerprint detection components corresponds to one of the control lines $G_1$ respectively, and each column of fingerprint detection components corresponds to a same fingerprint recognition signal line 120.

An anode of the photodiode is coupled to the low level input terminal $V_D$, and a cathode of the photodiode is coupled to the first electrode of the control transistor $T_1$ in the fingerprint detection component in which the photodiode is included.

Gates of control transistors $T_1$ of the fingerprint detection components in a same row are coupled to one of the control lines $G_1$, and second electrodes of the control transistors $T_1$ of the fingerprint detection components in a same column are coupled to a same fingerprint recognition signal line.

That is to say, the control transistor $T_1$ is equivalent to a switch for the photodiode, when fingerprint recognition is required, the control transistor $T_1$ is controlled so that the photodiode outputs the detection current. Specifically, in a case where the control transistor $T_1$ is an N-type transistor, when the control line $G_1$ is applied with a high level signal, the control transistor $T_1$ is turned on. On the contrary, in a case where the control transistor $T_1$ is a P-type transistor, when the control line $G_1$ is applied with a low level signal, the control transistor $T_1$ is turned on. Thus, it is convenient to control the time at which the photodiode outputs the detection current, by a simple structure.

In the present disclosure, specific setting and specific structure of the noise reduction circuit are not specifically limited. For example, the noise reduction circuit may include a plurality of resistive components, and at least one of the resistive components is coupled in series in each of the fingerprint recognition signal lines.

Figure 2:
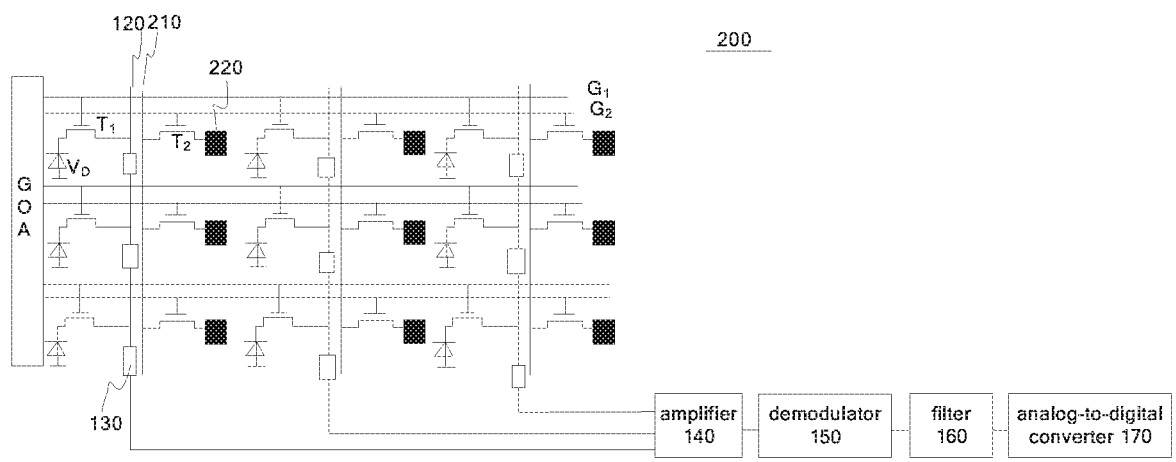
FIG. 2 is a schematic structural diagram of a display substrate in an embodiment of the present disclosure.

Specifically, as shown in FIG. 2, the second electrode of each of the control transistors T1 is coupled in series to one resistive component.

Figure 3:
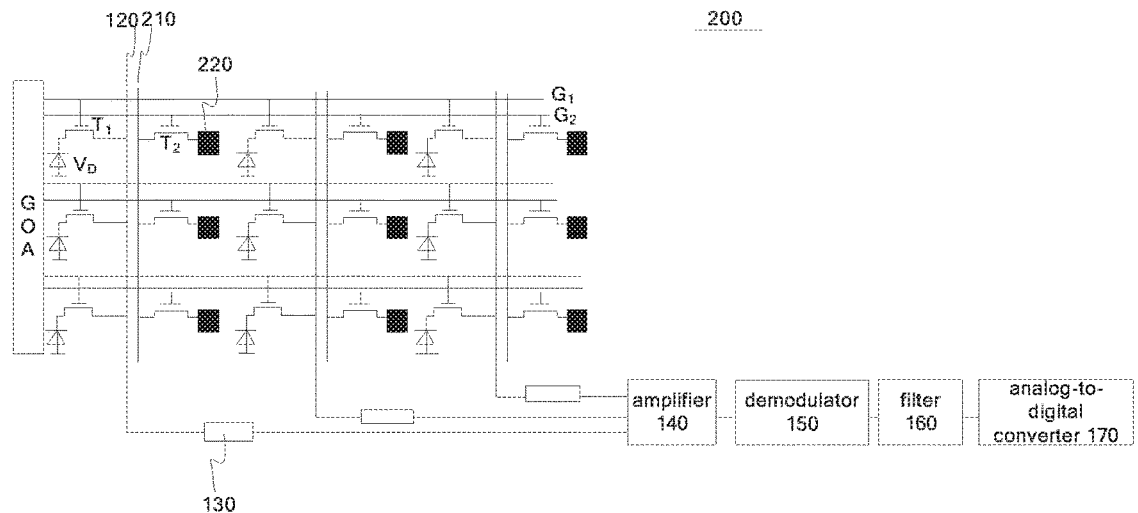
FIG. 3 is a schematic structural diagram of a display substrate in an embodiment of the present disclosure.

In a second aspect, with reference to FIGS. 2, 3 and 4, the present disclosure provides a display substrate 200. The display substrate 200 includes the aforementioned fingerprint recognition device 100.

The display substrate 200 of the present embodiment is a specific application of the aforementioned fingerprint recognition device 100. The display substrate may be of a conventional liquid crystal display panel or an OLED display panel. Since wiring arrangement of pixel circuit of the display panel is complicated, for example, a plurality of gate lines and a plurality of data lines are arranged, the fingerprint recognition signal line 120 of the fingerprint recognition device 100 is close to the gate line or the data line. When the fingerprint detection component 110 outputs the detection current to the fingerprint recognition signal line 120, the fingerprint recognition signal line 120 is easily coupled with the gate line or the data line or the like, causing interference with the detection current, thereby affecting the accuracy of fingerprint recognition. However, the fingerprint recognition device 100 of the present embodiment further has a noise reduction circuit 130 provided in series in the fingerprint recognition signal line 120. The noise reduction circuit 130 has a large resistance, which can effectively reduce the magnitude of the detection current received by the fingerprint recognition signal line, so that the current generated by the coupling with other data lines can be filtered out, therefore, the interference with the detection current can be reduced, and the accuracy of the fingerprint recognition of the display substrate 200 can be improved.

In some implementations, the display substrate 200 described above includes display data lines 210. The fingerprint recognition signal lines 120 are provided in parallel with the display data lines 210, and the fingerprint detection component 110 is provided in the pixel element of the display substrate 200.

The principle of fingerprint recognition of the display substrate 200 will be described below with reference to FIGS. 2, 3 and 4.

Referring to FIG. 2, an embodiment of a display substrate 200 including the fingerprint recognition device 100 described above is illustrated.

The display substrate 200 includes a gate driving circuit GOA and pixel elements (not labeled) arranged in a plurality of rows and a plurality of columns, each of the pixel elements includes a driving transistor $T_2$ and a sub-pixel element 220 coupled to the driving transistor $T_2$. A control electrode of the driving transistor $T_2$ is coupled to the gate line $G_2$, a first electrode of the driving transistor $T_2$ is coupled to the display data line 210, and a second electrode of the driving transistor $T_2$ is coupled to the sub-pixel element 220.

Description is made by taking a photodiode as an example of the fingerprint detection component 110. The photodiode is provided corresponding to the sub-pixel element 220. The photodiodes correspond to control transistors $T_1$ in one-to-one correspondence manner. A control electrode of the control transistor $T_1$ is coupled to the control line $G_1$. A control signal of the control line $G_1$ can be supplied by the gate driving circuit GOA. A first electrode of the control transistor T1 is coupled to the cathode of the photodiode, a second electrode of the control transistor $T_1$ is coupled to the fingerprint recognition signal line 120, and the anode of the photodiode is electrically coupled to the low level input terminal $V_D$. In the present disclosure, the fingerprint recognition signal lines 120 are provided in parallel with the display data lines 210, and each fingerprint detection component 110 corresponds to one noise reduction circuit 130. Each column of fingerprint detection components 110 share one of fingerprint recognition signal line 120, then the fingerprint recognition signal line 120 is coupled to the amplifier 140, the demodulator 150, the filter 160 and the analog-to-digital converter 170 successively.

In a case where the fingerprint is recognized by using the display substrate 200 having the above structure, when the user's finger touches the display screen, the photodiode receives an optical signal reflected by ridges and valleys of the fingerprint, and the photodiode converts the optical signal into the detection current. In a case where the control transistor $T_1$ is an NPN type transistor, when the control line $G_1$ receives a high level signal (alternatively, when the control transistor $T_1$ is a PNP type transistor, the control line $G_1$ receives a low level signal), the control transistor $T_1$ is turned on, so that the detection current is transmitted to the fingerprint recognition signal line 120, and the detection current is subjected to a noise reduction by the noise reduction circuit 130 first, then is introduced into the amplifier 140, the demodulator 150, the filter 160 and the device 170 sequentially, and the fingerprint recognition can be finally achieved by using the digital signal converted by the analog-to-digital converter 170. Due to the presence of the noise reduction circuit 130, interference of other components (e.g., display data lines 210) with the current signal in the fingerprint recognition signal line 120 due to coupling between the other components and the fingerprint recognition signal line 120 can be reduced, thereby improving the accuracy of the fingerprint recognition.

Referring to FIG. 3, another embodiment of the display substrate 200 including the fingerprint recognition device 100 described above is shown. The present embodiment differs from the embodiment shown in FIG. 2 in the position of the noise reduction circuit 130, specifically, in the present embodiment, each column of the fingerprint detection components 110 share one noise reduction circuit 130, and the rest structure of the present embodiment is the same as that shown in FIG. 2, thus is not described herein. Referring to FIG. 4, a still another embodiment of the display substrate 200 including the fingerprint recognition device 100 described above is shown. This embodiment differs from the embodiment shown in FIGS. 2 and 3 in the positions of the noise reduction circuits 130, in the present embodiment, in addition to that the noise reduction circuits 130 are provided corresponding to the fingerprint detection components 110 in one-to-one correspondence manner, and a noise reduction circuit 130 is also provided at the final output terminal of each column of the fingerprint recognition signal line 120 (i.e., at the input side of the amplifier 140). That is, the embodiment shown in FIG. 4 is a combination of the embodiments shown in FIG. 2 and FIG. 3, and the rest structures of the present embodiment are the same as those shown in FIG. 2 and FIG. 3, thus are not described herein.

With the fingerprint recognition device of the present disclosure, in a product in which the fingerprint recognition device is applied to implement fingerprint recognition, such as in a display panel and in a display apparatus, the fingerprint recognition device is generally embedded in the pixel element of the display panel. Since wiring arrangement of pixel circuit of the display panel is complicated, for example, a plurality of gate lines and a plurality of data lines are arranged, the fingerprint recognition signal line of the fingerprint recognition device is close to the gate line or the data line. When the fingerprint detection component outputs the detection current to the fingerprint recognition signal line, the fingerprint recognition signal line is easily coupled with the gate line or the data line or the like, causing interference with the detection current, thereby affecting the accuracy of fingerprint recognition. However, the fingerprint recognition device of the present embodiment further has a noise reduction circuit provided in series in the fingerprint recognition signal line. The noise reduction circuit has a large resistance, which can effectively reduce the magnitude of the detection current received by the fingerprint recognition signal line, so that the current generated by coupling the fingerprint recognition signal line with other data lines can be filtered out, therefore, the interference with the detection current can be reduced, and the accuracy of the fingerprint recognition can be improved.

It should be understood that, the foregoing embodiments are only exemplary embodiments used for explaining the principle of the present disclosure, but the present disclosure is not limited thereto. Various variations and improvements may be made by a person skilled in the art without departing from the spirit and essence of the present disclosure, and these variations and improvements also fall into the protection scope of the present disclosure.

The invention claimed is:

1. A fingerprint recognition device, comprising:
   at least one fingerprint detection component;
   at least one fingerprint recognition signal line, wherein the fingerprint detection component outputs a detection current to the fingerprint recognition signal line;
   at least one noise reduction circuit serially coupled in the fingerprint recognition signal line, the noise reduction circuit being a resistive component; and
   a fingerprint determination circuit coupled to the fingerprint recognition signal line, configured to determine a morphology of a fingerprint according to a current signal, subjected to a noise reduction by the noise reduction circuit and transmitted by the fingerprint recognition signal line, wherein the at least one fingerprint detection component comprises a plurality of fingerprint detection components and the at least one fingerprint recognition signal line comprise a plurality of fingerprint recognition signal lines, each of the fingerprint detection components comprising a photodiode and a control transistor, the plurality of fingerprint detection components being arranged in a plurality of rows and a plurality of columns, and the at least one noise reduction circuit comprises a plurality of first noise reduction circuits;

an anode of the photodiode is coupled to a low level input terminal, and a cathode of the photodiode is coupled to a first electrode of the control transistor in the fingerprint detection component in which the photodiode is included;

gates of control transistors of the fingerprint detection components in a same row are electrically coupled to a same control line, and second electrodes of the control transistors of the fingerprint detection components in a same column are electrically coupled to a same one of the fingerprint recognition signal lines, and wherein the second electrodes of the control transistors are coupled in series to the first noise reduction circuits in one-to-one correspondence.

2. The fingerprint recognition device of claim 1, wherein the fingerprint determination circuit comprises an amplifier, a demodulator, a filter, and an analog-to-digital converter, wherein an input terminal of the amplifier is coupled to the fingerprint recognition signal line, and is configured to amplify the current signal transmitted by the fingerprint recognition signal line;

the demodulator is configured to demodulate the current signal output from the amplifier;

the filter is configured to filter the current signal output from the demodulator;

the analog-to-digital converter is configured to perform an analog-to-digital conversion on the current signal output from the filter to determine the morphology of the fingerprint.

3. A display substrate, comprising the fingerprint recognition device according to claim 2.

4. The display substrate of claim 3, comprising a display data line, the fingerprint recognition signal line is provided in parallel with the display data line, and the fingerprint detection component is provided in a pixel element of the display substrate.

5. The fingerprint recognition device of claim 1, wherein the at least one noise reduction circuit comprises a plurality of second noise reduction circuits, the second noise reduction circuits are coupled in series in the fingerprint recognition signal lines in one-to-one correspondence.

6. The fingerprint recognition device of claim 5, wherein each of the first noise reduction circuits and the second noise reduction circuits comprises a resistance element.

7. The fingerprint recognition device of claim 5, each of the first noise reduction circuits and the second noise reduction circuits comprises a thin film transistor and a control sub-circuit configured to control the thin film transistor such that the thin film transistor operates in an adjustable resistance region.

8. The fingerprint recognition device of claim 5, wherein the first noise reduction circuits and the second noise reduction circuits have a resistance greater than a preset resistance.

9. The fingerprint recognition device of claim 8, wherein the preset resistance is not less than 1 G ohm.

10. A display substrate, comprising the fingerprint recognition device according to claim 1.

11. The display substrate of claim 10, comprising a display data line, the fingerprint recognition signal line is provided in parallel with the display data line, and the fingerprint detection component is provided in a pixel element of the display substrate.

12. A display apparatus comprising the display substrate according to claim 11.

13. A display apparatus comprising the display substrate according to claim 10.

* * * * *